(12) United States Patent
Imoto et al.

(10) Patent No.: US 8,735,492 B2
(45) Date of Patent: May 27, 2014

(54) METHOD FOR PRODUCING FLUORINE-CONTAINING POLYMER

(75) Inventors: Katsuhiko Imoto, Settsu (JP); Shumi Nishii, Settsu (JP); Yoshinari Fukuhara, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 13/392,814

(22) PCT Filed: Aug. 25, 2010

(86) PCT No.: PCT/JP2010/064381
§ 371 (c)(1),
(2), (4) Date: Feb. 27, 2012

(87) PCT Pub. No.: WO2011/024857
PCT Pub. Date: Mar. 3, 2011

(65) Prior Publication Data
US 2012/0157621 A1    Jun. 21, 2012

(30) Foreign Application Priority Data

Aug. 28, 2009 (JP) ................................ 2009-198187
Nov. 20, 2009 (JP) ................................ 2009-265131

(51) Int. Cl.
*C08F 2/24* (2006.01)
(52) U.S. Cl.
USPC ............ 524/747; 524/544; 524/751; 524/805
(58) Field of Classification Search
USPC .................. 524/747, 751, 544, 805
See application file for complete search history.

(56) References Cited

U.S. PATENT DOCUMENTS

| 6,512,063 | B2 | 1/2003 | Tang |
| 6,869,997 | B2 * | 3/2005 | Wille et al. ................. 524/544 |

| 2007/0018783 | A1 | 1/2007 | Erhardt |
| 2007/0032591 | A1 | 2/2007 | Durali et al. |
| 2010/0222494 | A1 | 9/2010 | Imoto et al. |

FOREIGN PATENT DOCUMENTS

| EP | 2407490 A1 | | 1/2012 |
| JP | 11-5951 A | | 1/1999 |
| JP | 11-236317 | * | 8/1999 |
| JP | 11-246330 | * | 9/1999 |
| JP | 2003-119203 | * | 4/2003 |
| JP | 2003-119203 A | | 4/2003 |
| JP | 2003-119203 A | | 4/2003 |
| JP | 2006-265516 A | | 10/2006 |
| JP | 2008-231173 A | | 10/2008 |
| JP | 2008-231173 A | | 10/2008 |
| WO | 2005063827 A1 | | 7/2005 |
| WO | WO-2005/063827 A1 | * | 7/2005 |
| WO | WO 2005/063827 A1 | | 7/2005 |
| WO | 2007015477 A1 | | 2/2007 |
| WO | WO 2009/145117 A1 | | 12/2009 |
| WO | WO 2010/104142 A1 | | 9/2010 |

OTHER PUBLICATIONS

Extended European Search Report dated Apr. 24, 2013 for counterpart EP Appln. No. 10811906.6.

* cited by examiner

*Primary Examiner* — Peter D. Mulcahy
*Assistant Examiner* — Henry Hu
(74) *Attorney, Agent, or Firm* — Sughrue Mion, PLLC

(57) ABSTRACT

An object of the present invention is to provide a method for producing a fluoropolymer which produces a large number of particles with a small particle size using a specific non-fluorous compound having surfactant ability. The method for producing a fluoropolymer includes aqueous dispersion polymerization of a monomer including at least one fluoroolefin in the presence of a compound (1) represented by the formula: $CH_2=CR^1—R^2—O-(AO)_p—X$ (in the formula, $R^1$ is hydrogen or an alkyl group; $R^2$ is an alkylene group having two or more carbon atoms; AO is a linear or branched oxyalkylene group having 2 to 4 carbon atoms; p is a positive integer; X is H or $SO_3Y$ wherein Y is $NH_4$ or an alkaline metal; and AO may be the same or different and may form two or more blocks if there is more than one AO.)

7 Claims, No Drawings

METHOD FOR PRODUCING FLUORINE-CONTAINING POLYMER

CROSS REFERENCE TO RELATED APPLICATION

This application is a National Stage of International Application No. PCT/JP2010/064381, filed on Aug. 25, 2010, claiming priority based on Japanese Patent Application Nos. 2009-198187, filed Aug. 28, 2009 and JP 2009-265131, filed Nov. 20, 2009, the contents of all of which are incorporated herein by reference in their entirety.

TECHNICAL FIELD

The present invention relates to a method for producing a fluoropolymer using a non-fluorous compound having surfactant ability.

BACKGROUND ART

Fluoropolymers are used as materials for various products in a wide range of industries including automotive industry, semiconductor industry, chemical industry, and paint industry due to their advantages such as prominent chemical resistance, solvent resistance, heat resistance, and stain resistance.

Fluoropolymers are produced by emulsion polymerization, suspension polymerization, or solution polymerization of fluoroolefins. In the case of emulsion polymerization, surfactants are typically used. As more surfactant is used, more polymer particles are produced in early stages of the emulsion polymerization, resulting in a higher polymerization rate and improved productivity of a fluoropolymer. However, too much surfactant often results in a fluoropolymer that is poor in properties such as water resistance. This problem has created a need for the development of production methods by which polymerization is efficiently carried out in the presence of a small amount of a surfactant without causing adverse effects on the properties of a resulting fluoropolymer.

In response to the above-mentioned situation, a method for producing a fluoropolymer using a linear aliphatic sulfonate surfactant has been proposed (Patent Document 1). This method aims to replace expensive ammonium perfluorooctanoate, which is commonly used in emulsion polymerization of fluoropolymers, with a linear aliphatic sulfonate surfactant. However, one disadvantage of this method is that it produces only a small number of particles.

Also, the following methods were proposed: production methods using an alkylphosphoric acid or an ester thereof as a non-fluorous surfactant (Patent Documents 2 and 3); and a method using a compound containing a quaternary carbon atom to which groups, such as phosphoric acid, sulfonic acid, and carboxylic acid groups, are attached (Patent Document 4).

However, the use of an alkylphosphoric acid or an ester thereof does not completely ensure sufficient levels in terms of the number of produced particles, the polymerization rate, the molecular weight of resulting polymers, the polymer concentration of dispersions, the polymerization temperature, the polymerization pressure, and the like. Besides, a further increase in particle production is required of the method using a compound containing a quaternary carbon atom to which groups, such as phosphoric acid, sulfonic acid, and carboxylic acid groups, are attached.

Patent Document 1: U.S. Pat. No. 6,512,063
Patent Document 2: US 2007/0032591
Patent Document 3: US 2007/0018783
Patent Document 4: WO 2005/063827

SUMMARY OF THE INVENTION

Problems to be Solved by the Invention

An object of the present invention is to provide a method for producing a fluoropolymer which produces a large number of particles with a small particle size using a specific non-fluorous compound having surfactant ability.

Means for Solving the Problems

The present invention provides a method for producing a fluoropolymer, which includes aqueous dispersion polymerization of a monomer including at least one fluoroolefin in the presence of a compound (1) represented by the following formula (1):

$$CH_2=CR^1-R^2-O-(AO)_p-X \qquad (1)$$

wherein $R^1$ is hydrogen or an alkyl group; $R^2$ is an alkylene group having two or more carbon atoms; AO is a linear or branched oxyalkylene group having 2 to 4 carbon atoms; p is a positive integer; X is H or $SO_3Y$ wherein Y is $NH_4$ or an alkaline metal; and AO may be the same or different and may form two or more blocks if there is more than one AO.

Preferably, the compound (1) is a compound (2) represented by the following formula (2):

$$CH_2=CR^3-R^4-O-(BO)_m-(EO)_n-X \qquad (2)$$

wherein $R^3$ is an alkyl group having 1 to 10 carbon atoms; $R^4$ is a linear alkylene group having 2 to 10 carbon atoms; X is defined as in the formula (1); BO is a butylene oxide unit; EO is a $CH_2CH_2O$ unit or a $CH(CH_3)$ 0 unit; m is an integer of 0 to 50; n is an integer of 0 to 100; and m+n is an integer of 1 to 150.

A fluorosurfactant having 6 or less carbon atoms may also be present.

In order to achieve good lightfastness, chemical resistance, and solvent resistance, the fluoroolefin for the polymerization is preferably at least one fluoroolefin selected from the group consisting of vinyl fluoride, vinylidene fluoride, tetrafluoroethylene, hexafluoropropylene, and chlorotrifluoroethylene.

In particular, the production method is effective for polymerization of vinylidene fluoride, tetrafluoroethylene, and chlorotrifluoroethylene, and for polymerization of vinylidene fluoride and hexafluoropropylene.

The aqueous distribution polymerization is preferably emulsion polymerization or suspension polymerization.

Effects of the Invention

The present invention enables production of a large number of fluoropolymer particles with a small particle size by using a specific non-fluorous compound having surfactant ability.

MODES FOR CARRYING OUT THE INVENTION

The method for producing a fluoropolymer of the present invention includes aqueous dispersion polymerization of a monomer including at least one fluoroolefin in the presence of a compound (1) represented by the following formula (1):

$$CH_2=CR^1-R^2-O-(AO)_p-X \qquad (1)$$

wherein $R^1$ is hydrogen or an alkyl group; $R^2$ is an alkylene group having two or more carbon atoms; AO is a linear or branched oxyalkylene group having 2 to 4 carbon atoms; p is a positive integer; X is H or $SO_3Y$ wherein Y is $NH_4$ or an alkaline metal such as K or Na; and AO may be the same or different and may form two or more blocks if there is more than one AO.

In the formula (1), $R^1$ is hydrogen or an alkyl group. In order to obtain a dispersion having good stability, $R^1$ is preferably an alkyl group having 1 to 10 carbon atoms, and particularly preferably a methyl group.

In the formula (1), $R^2$ is an alkylene group having two or more carbon atoms and may be linear or branched. In order to obtain a dispersion having good stability, $R^2$ is preferably an alkylene group having 2 to 10 carbon atoms, and particularly preferably a linear alkylene group having 2 to 4 carbon atoms.

AO is a linear or branched oxyalkylene group having 2 to 4 carbon atoms such as ethylene oxide ($-CH_2CH_2O-$), propylene oxide, butylene oxide, tetrahydrofuran, or $-CH(CH_3)O-$, and can be formed by processes such as addition polymerization of alkylene oxide(s). In the case that AO is formed by addition polymerization of alkylene oxide(s), AO corresponds to the alkylene oxide(s) and the like for the addition. The polymerization of alkylene oxide(s) and the like for the addition is not particularly limited and may be homopolymerization of a single alkylene oxide, or random copolymerization, block copolymerization, or random/block copolymerization of two or more alkylene oxides.

The symbol p is a positive integer, and is, for example, an integer of 1 to 1000, preferably an integer of 1 to 200, and particularly preferably an integer of 10 to 40.

In particular, the compound (1) is preferably a compound (2) represented by the following formula (2):

$$CH_2=CR^3-R^4-O-(BO)_m-(EO)_n-X \quad (2)$$

wherein $R^3$ is an alkyl group having 1 to 10 carbon atoms; $R^4$ is a linear alkylene group having 2 to 10 carbon atoms; X is defined as in the formula (1); BO is a butylene oxide unit; EO is a $CH_2CH_2O$ unit or a $CH(CH_3)O$ unit; m is an integer of 0 to 50; n is an integer of 0 to 100; and m+n is an integer of 1 to 150.

Specific preferred examples of the compound (1) include, but are not limited to, $CH_2=C(CH_3)CH_2CH_2-O-(BO)_m-(EO)_n-H$, $CH_2=C(CH_3)CH_2CH_2-O-(BO)_m-(EO)_n-SO_3NH_4$ (in the formulas, BO, EO, n, and m are defined as in the formula (2).)

The fluoroolefin for the polymerization in the production method of the present invention is not particularly limited and may be one or more fluoroolefins. Examples of the fluoroolefin include perfluoroolefins such as tetrafluoroethylene (TFE), hexafluoropropylene (HFP), perfluoro(alkyl vinyl ethers) (PAVEs), and those represented by the formulas:

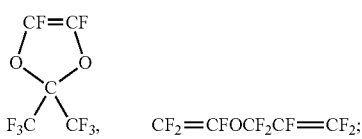
$CF_2=CFOCF_2CF=CF_2$;

and non-perfluoroolefins such as chlorotrifluoroethylene (CTFE), vinyl fluoride (VF), vinylidene fluoride (VdF), trifluoroethylene, trifluoropropylene, pentafluoropropylene, tetrafluoropropylene, and hexafluoroisobutene. Examples of PAVEs include perfluoro(methyl vinyl ether) (PMVE), perfluoro(ethyl vinyl ether) (PEVE), and perfluoro(propyl vinyl ether) (PPVE).

Functional group-containing fluoroolefin monomers may also be used. Specific examples of such functional group-containing fluoroolefins include compounds represented by the formula (3):

$$CX^1_2=CX^2-(Rf)_m-Y^1 \quad (3)$$

(in the formula, $Y^1$ is $-OH$, $-COOH$, $-SO_2F$, or $-SO_3M^2$ ($M^2$ is hydrogen, $NH_4$, or an alkaline metal), a carboxylate salt, a carboxyl ester group, an epoxy group, or a cyano group; $X^1$ and $X^2$, which may be the same or different, are each hydrogen or fluorine; $R_f$ is a C1-C40 divalent fluoroalkylene group or a C1-C40 divalent fluoroalkylene group including an ether bond; and m is 0 or 1.

Specific examples thereof include those represented by the following formulas.

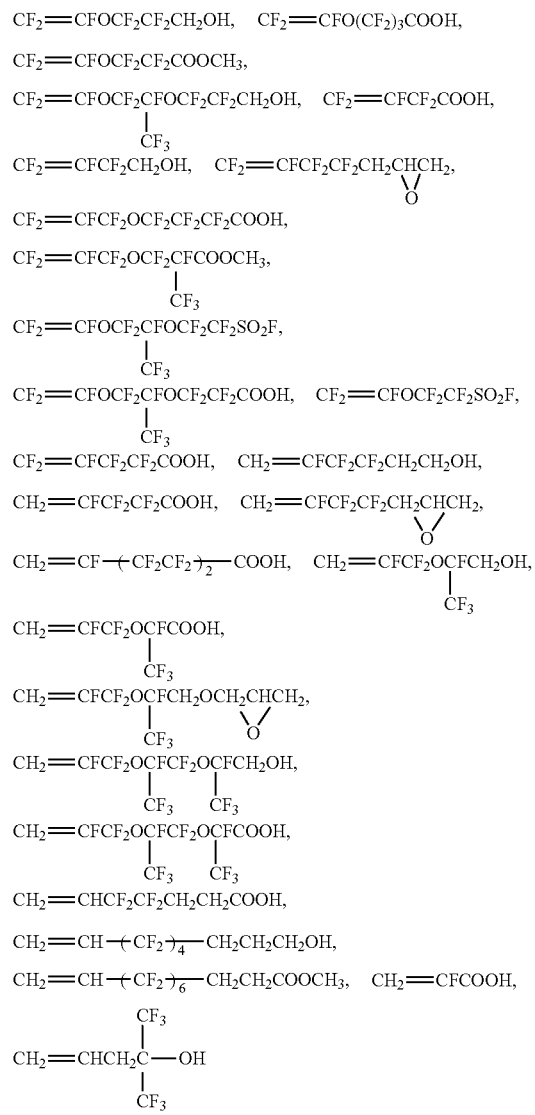

Examples of the non-perfluoroolefins include iodine-containing monomers such as iodides of perfluoro vinyl ethers (e.g. perfluoro(6,6-dihydro-6-iodine-3-oxa-1-hexene) and perfluoro(5-iodine-3-oxa-1-pentene) disclosed in JP 05-63482 B and JP 62-12734 A).

In the present invention, non-fluorous monomer(s) copolymerizable with the fluoroolefin may be used together.

In the present invention, the aqueous dispersion polymerization is carried out in the presence of the compound (1) (surfactant). The aqueous dispersion polymerization is, for example, emulsion polymerization or suspension polymerization. In particular, emulsion polymerization is suited because a large number of polymer particles with a small particle size are produced. Specifically, it is preferred that emulsion polymerization is carried out in early stages of seed polymerization, that is, for the production of seed particles because a larger number of particles are produced even if the amount of the surfactant in the resulting fluoropolymer product is the same.

For example, in the case of emulsion polymerization, the amount of the compound (1) is preferably 10 to 5000 ppm, and more preferably 20 to 4000 ppm relative to the total amount of water. The amount is further preferably 50 to 1000 ppm, and particularly preferably 100 to 700 ppm. If the amount of the compound (1) is less than 10 ppm, the surfactant ability is low, resulting in the production of a smaller number of particles; if the amount is more than 5000 ppm, the polymerization rate is likely to be low.

Although the compound (1) alone is enough to stably proceed the emulsion polymerization, other surfactant(s) may be used together.

Examples of other surfactants include fluorosurfactants and non-fluorosis (hydrocarbon) surfactants (except for the compound of the formula (1)).

Examples of such fluorosurfactants include anionic fluorosurfactants. These are preferred in terms of polymerization stability.

Examples of anionic fluorosurfactants include known ones such as those disclosed in US 2007/0015864, US 2007/0015865, US 2007/0015866, US 2007/0276103, US 2007/0117914, US 2007/142541, US 2008/0015319, U.S. Pat. No. 3,250,808, U.S. Pat. No. 3,271,341, JP 2003-119204 A, WO 2005/042593, WO 2008/060461, WO 2007/046377, WO 2007/119526, WO 2007/046482, and WO 2007/046345.

Specific examples of fluorosurfactants usable together include $F(CF_2)_nCOOM$, $CF_3CF_2CF_2OCF(CF_3)CF_2OCF(CF_3)COOM$, $CF_3CF_2OCF(CF_3)CF_2OCF(CF_3)COOM$, $CF_3OCF(CF_3)CF_2OCF(CF_3)COOM$ $H(CF_2CF_2)_2CH_2OCF(CF_3)COOM$, $H(CF_2)_mCOOM$, $C_6F_{13}CH_2CH_2SO_3M$, $F(CF_2CF_2)_pCH_2CH_2SO_3M$, and $F(CF_2CF_2)_qCH_2CH_2SO_4M$ (in the formulas, M is a monovalent cation; n is an integer of 2 to 5; m is an integer of 2 to 10; p is an integer of 2 to 10; and q is an integer of 2 to 10.)

Especially, fluorosurfactants having 6 or less carbon atoms, in particular, anionic fluorosurfactants having 6 or less carbon atoms are preferred because a liquid polymer product containing a fluoropolymer at a high concentration is produced as a stable dispersion.

Examples of non-fluorous (hydrocarbon) surfactants include hydrocarbon surfactants such as $CH_3(CH_2)_rSO_3M$, $CH_3(CH_2)_sSO_4M$, $CH_3(CH_2)_tCOOM$, $H(CH_2)_uCOO(CH_2CH_2O)_vH$, and $(NaSO_3)CH((CH_2)_wCH_3)((CH_2)_xCH_3)$ (in the formulas, M is a monovalent cation; r is an integer of 2 to 16; s is an integer of 2 to 16; t is an integer of 2 to 16; u is an integer of 2 to 40; v is an integer of 2 to 45; and w+x=10 to 20.)

Regarding the amount of other surfactant(s) usable together, for example, in the case of emulsion polymerization, the total amount of the compound (1) and other surfactant(s) is preferably 10 to 5000 ppm, and more preferably 20 to 4000 ppm relative to the total amount of water. If the total amount of the compound (1) and other surfactant (s) is less than 10 ppm, the surfactant ability is low, resulting in the production of a smaller number of particles; if the total amount is more than 5000 ppm, the polymerization rate is likely to be low.

Other examples of surfactants usable together include reactive fluorosurfactants each including a fluorocompound having a radical polymerizable unsaturated bond and a hydrophilic group in the molecule. If such a reactive fluorosurfactant is present in the reaction system during the polymerization, the reactive fluorosurfactant may be incorporated as a part of the polymer chain in a resulting polymer.

Examples of such reactive surfactants include fluorocompoounds disclosed in JP 08-67795 A.

The polymerization temperature is not particularly limited and is optimally determined by considering the type of polymerization initiator(s). Too high a temperature tends to reduce the monomer density in a gas phase or may induce a chain branching reaction of a polymer. Consequently, a target copolymer may not be obtained. Too low a temperature leads to slow polymerization, possibly resulting in low productivity. The polymerization temperature is preferably 40° C. to 120° C., and more preferably 50° C. to 100° C.

The monomer may be continuously added or portions of the monomer may be successively added.

The polymerization initiator(s) may be oil-soluble peroxides but peroxycarbonates such as diisopropyl peroxydicarbonate (IPP) and di-n-propyl peroxydicarbonate (NPP), which are typical examples of oil-soluble initiators, have the problems that they have a risk of explosion, and are expensive, and that they tend to cause scale build-up on the side wall of a polymerization reactor during the polymerization reaction. In order to further reduce the compression set of fluoropolymers, it is preferable to use water-soluble radical polymerization initiator(s). Preferred examples of water-soluble radical polymerization initiators include ammonium salts, potassium salts, and sodium salts of persulfuric acid, perboric acid, perchloric acid, perphosphoric acid, and percarbonic acid. In particular, ammonium persulfate and potassium persulfate are preferred.

The amount of polymerization initiator(s) is not particularly limited. An amount that does not significantly reduce the polymerization rate or more (for example, a few parts per million relative to the water concentration) of initiator(s) is added at once in an early stage of the polymerization, in portions, or continuously. The upper limit of the amount is within a range where polymerization reaction heat can be removed from the surface of the equipment.

In the production method of the present invention, molecular weight regulator(s) and the like may also be added. The molecular weight regulator(s) may be added at once in an early stage, or may be added continuously or in portions.

Examples of molecular weight regulators include esters such as dimethyl malonate, diethyl malonate, methyl acetate, ethyl acetate, butyl acetate, and dimethyl succinate. Other examples thereof include isopentane, isopropanol, acetone, various mercaptans, carbon tetrachloride, cyclohexane, monoiodo methane, 1-iodomethane, 1-iodo-propane, isopropyl iodide, diiodo methane, 1,2-diiodomethane, and 1,3-diiodopropane.

In addition, other agents such as buffer may also be added optionally. In this case, it is preferred that the amount thereof is determined not to impair the effects of the present invention.

The polymerization pressure is suitably determined within the range of 0.1 to 10 MPa, and more suitably within the range of 0.2 to 8 MPa. Within the above ranges, the pressure may be low (0.1 to 1 MPa) or high (1 to 10 MPa).

As stirring means, for example, an anchor, blade, a turbine blade, an inclined blade, or the like can be used, but stirring is preferably conducted by a large-scale blade such as FULLZONE or MAXBLEND in order to disperse monomers well and achieve good polymer dispersion stability. The stirring device may be a horizontal stirring device or a vertical stirring device.

The production method of the present invention can stably provide even a liquid polymer product containing a fluoropolymer at a high concentration. For example, if the compound (1) is used alone, a stable fluoropolymer dispersion having a fluoropolymer concentration of about 45% by mass is provided; if a fluorosurfactant, in particular, an anionic fluorosurfactant having 6 or less carbon atoms is used together, a stable fluoropolymer dispersion having a high fluoropolymer concentration of higher than 45% by mass, for example, 45 to 55% by mass is provided.

EXAMPLES

The following examples are set forth to specifically illustrate the present invention and are not intended to limit the present invention.

The devices and conditions used for evaluation of properties are listed below.

(1) Average Particle Size

Measuring device: MICROTRAC UPA available from Honeywell

Measuring method: Dynamic light scattering method

A sample was prepared by diluting an emulsion to be measured with pure water to a measurable concentration and measured at room temperature. An average size determined from data was regarded as a particle size.

(2) Number of Particles

Calculation Method: The number of particles was calculated from the average particle size determined in (1) and the solids content, assuming the specific gravity of each polymer to be 1.8.

(3) NMR Analysis:

NMR measuring device: product of VARIAN Inc.

$^1$H-NMR analysis condition: 400 MHz (tetramethylsilane=0 ppm)

$^{19}$F-NMR analysis condition: 376 MHz (trichlorofluoromethane=0 ppm)

(4) Molecular Weight Analysis:

The standard polystyrene equivalent weight average molecular weight and number average molecular weight were determined using Shodex GPC-104 available from Showa Denko K. K.

Measurement Condition
Carrier: Tetrahydrofuran (THF)
Flow rate: 0.6 ml/min
Column temperature: 40° C.
Sample: 3% THF solution of resin to be measured Example 1

A 2-L stainless steel autoclave was charged with 500 g of ion exchange water and 0.10 g of a compound (1-1) represented by the formula:

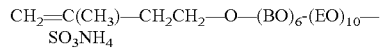

$CH_2$=$C(CH_3)$—$CH_2CH_2$—O—$(BO)_6$-$(EO)_{10}$—$SO_3NH_4$ (in the formula, BO is defined as in the formula (2); and EO is $CH_2CH_2O$) (200 ppm/water (water as polymerization medium, hereinafter the same)). The system was sufficiently purged with nitrogen gas, and then depressurized. Subsequently, a monomer mixture VdF/TFE/CTFE (=74/14/12 mol %) was introduced under pressure to provide a system pressure in the polymerization reactor of 0.75 to 0.80 MPa. The temperature was raised to 70° C.

Then, a polymerization initiator solution prepared by dissolving 1.0 g (2000 ppm/water) of ammonium persulfonate (APS) in 4 ml of ion exchange water and 0.75 g (1500 ppm/water) of ethyl acetate were introduced under pressure of nitrogen gas. Thus, the reaction was initiated while stirring at 600 rpm.

When the internal pressure began to decrease in the course of the polymerization, the monomer mixture VdF/TFE/CTFE (=74/14/12 mol %) was supplied to maintain the internal pressure within the range of 0.75 to 0.80 MPa. Unreacted monomers were discharged 2 hours 5 minutes after the start of polymerization, and then the autoclave was cooled. In this manner, a fluoropolymer dispersion (solids content: 10.6% by mass) was obtained.

The copolymer composition determined by NMR analysis was VdF/TFE/CTFE=70.0/12.5/17.5 (mol %). The average particle size of the obtained fluoropolymer was 85.3 nm and the number of particles in the dispersion was $2.11 \times 10^{14}$ (per g of water).

A 200 g portion of this dispersion was frozen at −10° C. for 24 hours to cause flocculation. The obtained flocs were rinsed with water and dried. In this manner, the fluoropolymer was recovered. The number average molecular weight and the weight average molecular weight determined by GPC were $2.50 \times 10^4$ and $10.01 \times 10^4$, respectively, and the molecular weight distribution Mw/Mn was 4.00.

Example 2

A 2-L stainless steel autoclave was charged with 500 g of ion exchange water and 0.10 g (200 ppm/water) of a compound (1-2) represented by the formula: $CH_2$=$C(CH_3)$—$CH_2CH_2$—O—$(BO)_6$-$(EO)_{20}$—H. The system was sufficiently purged with nitrogen gas, and then depressurized. Subsequently, a monomer mixture VdF/TFE/CTFE (=74/14/12 mol %) was introduced under pressure to provide a system pressure in the polymerization reactor of 0.60 to 0.65 MPa. The temperature was raised to 70° C.

Then, a polymerization initiator solution prepared by dissolving 1.0 g (2000 ppm/water) of ammonium persulfonate (APS) in 4 ml of ion exchange water and 0.75 g (1500 ppm/water) of ethyl acetate were introduced under pressure of nitrogen gas. Thus, the reaction was initiated while stirring at 600 rpm.

When the internal pressure began to decrease in the course of the polymerization, the monomer mixture VdF/TFE/CTFE (=74/14/12 mol %) was supplied to maintain the internal pressure within the range of 0.60 to 0.65 MPa. Unreacted monomers were discharged 2 hours 50 minutes after the start of polymerization, and then the autoclave was cooled. In this manner, a fluoropolymer dispersion (solids content: 11.5% by mass) was obtained.

The copolymer composition determined by NMR analysis was VdF/TFE/CTFE=70.9/12.1/17.0 (mol %). The average particle size of the obtained fluoropolymer was 78.7 nm and the number of particles in the dispersion was $2.83 \times 10^{14}$ (per g of water).

A 200 g portion of this dispersion was frozen at −10° C. for 24 hours to cause flocculation. The obtained flocs were rinsed with water and dried. In this manner, the fluoropolymer was recovered. The number average molecular weight and the weight average molecular weight determined by GPC were $1.40 \times 10^4$ and $9.20 \times 10^4$, respectively, and the molecular weight distribution Mw/Mn was 6.57.

Comparative Example 1

A 2-L stainless steel autoclave was charged with 500 g of ion exchange water and 0.1 g (200 ppm/water) of a compound represented by the formula:

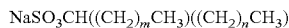

(a mixture of those with m+n being 14 to 17).
The system was sufficiently purged with nitrogen gas, and then depressurized. Subsequently, a monomer mixture VdF/TFE/CTFE (=74/14/12 mol %) was introduced under pressure to provide a system pressure in the polymerization reactor of 0.60 to 0.65 MPa. The temperature was raised to 70° C.

Then, a polymerization initiator solution prepared by dissolving 1.0 g (2000 ppm/water) of ammonium persulfonate (APS) in 4 ml of ion exchange water and 0.75 g (1500 ppm/water) of ethyl acetate were introduced under pressure of nitrogen gas. Thus, the reaction was initiated while stirring at 600 rpm.

When the internal pressure began to decrease in the course of the polymerization, the monomer mixture VdF/TFE/CTFE (=74/14/12 mol %) was supplied to maintain the internal pressure within the range of 0.60 to 0.65 MPa. Unreacted monomers were discharged 3 hours 7 minutes after the start of polymerization, and then the autoclave was cooled. In this manner, a fluoropolymer dispersion (solids content: 10.2% by mass) was obtained.

The copolymer composition determined by NMR analysis was VdF/TFE/CTFE=72.2/12.8/15.0 (mol %). The average particle size of the obtained fluoropolymer was 160.8 nm and the number of particles in the dispersion was $2.90 \times 10^{13}$ (per g of water).

A 200 g portion of this dispersion was frozen at $-10°$ C. for 24 hours to cause flocculation. The obtained flocs were rinsed with water and dried. In this manner, the fluoropolymer was recovered. The number average molecular weight and the weight average molecular weight determined by GPC were $7.81 \times 10^3$ and $7.54 \times 10^4$, respectively, and the molecular weight distribution Mw/Mn was 9.65.

Comparative Example 2

A 2-L stainless steel autoclave was charged with 500 g of ion exchange water and 0.50 g of a 50% aqueous solution of ammonium perfluorooctanoate (ammonium perfluorooctanoate concentration: 1000 ppm/water). The system was sufficiently purged with nitrogen gas, and then depressurized. Subsequently, a monomer mixture VdF/TFE/CTFE (=74/14/12 mol %) was introduced under pressure to provide a system pressure in the polymerization reactor of 1.00 to 1.10 MPa. The temperature was raised to 60° C.

Then, a polymerization initiator solution prepared by dissolving 0.20 g (400 ppm/water) of ammonium persulfonate (APS) in 4 ml of ion exchange water was introduced under pressure of nitrogen gas. Thus, the reaction was initiated while stirring at 600 rpm.

When the internal pressure began to decrease in the course of the polymerization, the monomer mixture VdF/TFE/CTFE (=74/14/12 mol %) was supplied to maintain the internal pressure within the range of 1.00 to 1.10 MPa. Three hours later, 0.20 g (400 ppm/water) of APS was introduced under pressure of nitrogen gas. Unreacted monomers were discharged 8 hours after the start of polymerization, and then the autoclave was cooled. In this manner, a fluoropolymer dispersion (solids content: 25.5% by mass) was obtained.

The copolymer composition determined by NMR analysis was VdF/TFE/CTFE=78.5/11.4/10.1 (mol %). The average particle size of the obtained fluoropolymer was 115 nm and the number of particles in the dispersion was $2.23 \times 10^{14}$ (per g of water).

A 200 g portion of this dispersion was frozen at $-10°$ C. for 24 hours to cause flocculation. The obtained flocs were rinsed with water and dried. In this manner, the fluoropolymer was recovered. Since this fluoropolymer was insoluble in THF, GPC to determine its molecular weight could not be performed.

Example 3

A 2-L stainless steel autoclave was charged with 500 g of ion exchange water and 0.10 g (200 ppm/water) of the compound (1-2). The system was sufficiently purged with nitrogen gas, and then depressurized. Subsequently, a monomer mixture VdF/HFP (=78/22 mol %) was introduced under pressure to provide a system pressure in the polymerization reactor of 0.75 to 0.80 MPa. The temperature was raised to 70° C.

Then, a polymerization initiator solution prepared by dissolving 1.0 g (2000 ppm/water) of ammonium persulfonate (APS) in 4 ml of ion exchange water and 0.75 g (1500 ppm/water) of ethyl acetate were introduced under pressure of nitrogen gas. Thus, the reaction was initiated while stirring at 600 rpm.

When the internal pressure began to decrease in the course of the polymerization, the monomer mixture VdF/HFP (=78/22 mol %) was supplied to maintain the internal pressure within the range of 0.75 to 0.80 MPa. Unreacted monomers were discharged 5 hours 6 minutes after the start of polymerization, and then the autoclave was cooled. In this manner, a fluoropolymer dispersion (solids content: 10.1% by mass) was obtained.

The copolymer composition determined by NMR analysis was VdF/HFP=86.7/13.3 (mol %). The average particle size of the obtained fluoropolymer was 55.0 nm and the number of particles in the dispersion was $7.16 \times 10^{14}$ (per g of water).

A 200 g portion of this dispersion was frozen at $-10°$ C. for 24 hours to cause flocculation. The obtained flocs were rinsed with water and dried. In this manner, the fluoropolymer was recovered. The number average molecular weight and the weight average molecular weight determined by GPC were $3.86 \times 10^4$ and $7.71 \times 10^4$, respectively, and the molecular weight distribution Mw/Mn was 2.00.

Example 4

A 2-L stainless steel autoclave was charged with 500 g of ion exchange water and 0.10 g (200 ppm/water) of the compound (1-2). The system was sufficiently purged with nitrogen gas, and then depressurized. Subsequently, VdF was introduced under pressure to provide a system pressure in the polymerization reactor of 0.75 to 0.80 MPa. The temperature was raised to 70° C.

Then, a polymerization initiator solution prepared by dissolving 1.00 g (2000 ppm/water) of ammonium persulfonate (APS) in 4 ml of ion exchange water and 0.75 g (1500 ppm/water) of ethyl acetate were introduced under pressure of nitrogen gas. Thus, the reaction was initiated while stirring at 600 rpm.

When the internal pressure began to decrease in the course of the polymerization, VdF was supplied to maintain the internal pressure within the range of 0.75 to 0.80 MPa. Unreacted monomers were discharged 8 hours 31 minutes after the start of polymerization, and then the autoclave was cooled. In this manner, a VdF homopolymer (PVdF) dispersion (solids content: 3.8% by mass) was obtained.

The average particle size of the obtained PVdF was 345 nm and the number of particles in the dispersion was $1.02 \times 10^{12}$ (per g of water).

Example 5

A 2-L stainless steel autoclave was charged with 500 g of ion exchange water and 0.10 g (200 ppm/water) of the compound (1-2). The system was sufficiently purged with nitrogen gas, and then depressurized. Subsequently, a monomer mixture VdF/TFE/HFP (=50/20/30 mol %) was introduced under pressure to provide a system pressure in the polymerization reactor of 0.80 MPa. The temperature was raised to 70° C.

Then, a polymerization initiator solution prepared by dissolving 1.00 g (2000 ppm/water) of ammonium persulfonate (APS) in 4 ml of ion exchange water and 0.75 g (1500 ppm/water) of ethyl acetate were introduced under pressure of nitrogen gas. Thus, the reaction was initiated while stirring at 600 rpm.

When the internal pressure began to decrease in the course of the polymerization, a monomer mixture VdF/TFE/HFP (=50/20/30 mol %) was supplied to maintain the internal pressure at 0.80 MPa. Unreacted monomers were discharged 4 hours 30 minutes after the start of polymerization, and then the autoclave was cooled. In this manner, a fluoropolymer dispersion (solids content: 6.6% by mass) was obtained.

The copolymer composition determined by NMR analysis was VdF/TFE/HFP=60.6/25.4/14.0 (mol %). The average particle size of the obtained fluoropolymer was 53.7 nm and the number of particles in the dispersion was $4.84 \times 10^{14}$ (per g of water).

Example 6

A 2-L stainless steel autoclave was charged with 1000 g of ion exchange water and 0.4 g (400 ppm/water) of the compound (1-2). The system was sufficiently purged with nitrogen gas, and then depressurized. Subsequently, VdF was introduced under pressure to provide a system pressure in the polymerization reactor of 2.3 to 2.5 MPa. The temperature was raised to 70° C.

Then, a polymerization initiator solution prepared by dissolving 1.0 g (1000 ppm/water) of ammonium persulfonate (APS) in 4 ml of ion exchange water was introduced under pressure of nitrogen gas. Thus, the reaction was initiated while stirring at 300 rpm.

When the internal pressure began to decrease in the course of the polymerization, VdF was supplied to maintain the internal pressure within the range of 2.3 to 2.5 MPa. Unreacted monomers were discharged 5 hours 48 minutes after the start of polymerization, and then the autoclave was cooled. In this manner, a VdF homopolymer (PVdF) dispersion of (solids content: 9.4% by mass) was obtained.

The average particle size of the obtained. PVdF was 118.5 nm and the number of particles in the dispersion was $6.62 \times 10^{13}$ (per g of water).

Example 7

A 2-L stainless steel autoclave was charged with 500 g of ion exchange water and 0.10 g (200 ppm/water) of the compound (1-2). The system was sufficiently purged with nitrogen gas, and then depressurized. Subsequently, a monomer mixture VdF/TFE (=60/40 mol %) was introduced under pressure to provide a system pressure in the polymerization reactor of 0.75 to 0.80 MPa. The temperature was raised to 70° C.

Then, a polymerization initiator solution prepared by dissolving 1.0 g (2000 ppm/water) of ammonium persulfonate (APS) in 4 ml of ion exchange water and 0.75 g (1500 ppm/water) of ethyl acetate were introduced under pressure of nitrogen gas. Thus, the reaction was initiated while stirring at 600 rpm.

When the internal pressure began to decrease in the course of the polymerization, a monomer mixture VdF/TFE (=60/40 mol %) was supplied to maintain the internal pressure within the range of 0.75 to 0.80 MPa. Unreacted monomers were discharged 2 hours 13 minutes after the start of polymerization, and then the autoclave was cooled. In this manner, a fluoropolymer dispersion (solids content: 11% by mass) was obtained.

The copolymer composition determined by NMR analysis was VdF/TFE=62.1/37.9 (mol %). The average particle size of the obtained fluoropolymer was 75.4 nm, and the number of particles in the dispersion was $3.06 \times 10^{14}$ (per g of water).

A 200 g portion of this dispersion was frozen at $-10°$ C. for 24 hours to cause flocculation. The obtained flocs were rinsed with water and dried. In this manner, the fluoropolymer was recovered. The number average molecular weight and the weight average molecular weight determined by GPC were $2.02 \times 10^4$ and $9.93 \times 10^4$, respectively, and the molecular weight distribution Mw/Mn was 4.92.

Example 8

A 2-L stainless steel autoclave was charged with 500 g of ion exchange water, 0.10 g (200 ppm/water) of the compound (1-2), and 0.50 g of a 50% aqueous solution of ammonium perfluorohexanoate (ammonium perfluorohexanoate concentration: 1000 ppm/water). The system was sufficiently purged with nitrogen gas, and then depressurized. Subsequently, a monomer mixture VdF/TFE/CTFE (=74/14/12 mol %) was introduced under pressure to provide a system pressure in the polymerization reactor of 0.60 to 0.65 MPa. The temperature was raised to 70° C.

Then, a polymerization initiator solution prepared by dissolving 1.0 g (2000 ppm/water) of ammonium persulfonate (APS) in 4 ml of ion exchange water and 0.75 g (1500 ppm/water) of ethyl acetate were introduced under pressure of nitrogen gas. Thus, the reaction was initiated while stirring at 600 rpm.

When the internal pressure began to decrease in the course of the polymerization, the monomer mixture VdF/TFE/CTFE (=74/14/12 mol %) was supplied to maintain the internal pressure within the range of 0.60 to 0.65 MPa. Unreacted monomers were discharged 3 hours 11 minutes after the start of polymerization, and then the autoclave was cooled. In this manner, a fluoropolymer dispersion (solids content: 13.4% by mass) was obtained.

The copolymer composition determined by NMR analysis was VdF/TFE/CTFE=72.3/12.9/14.8 (mol %). The average particle size of the obtained fluoropolymer was 70.1 nm and the number of particles in the dispersion was $4.77 \times 10^{14}$ (per g of water).

A 200 g portion of this dispersion was frozen at $-10°$ C. for 24 hours to cause flocculation. The obtained flocs were rinsed with water and dried. In this manner, the fluoropolymer was recovered. The number average molecular weight and the weight average molecular weight determined by GPC were 1.23×10⁴ and 7.14×10⁴, respectively, and the molecular weight distribution Mw/Mn was 5.80.

Comparative Example 3

A 2-L stainless steel autoclave was charged with 1000 g of ion exchange water and 0.50 g of a 50% aqueous solution of ammonium perfluorohexanoate (ammonium perfluorohexanoate concentration: 1000 ppm/water). The system was sufficiently purged with nitrogen gas, and then depressurized. Subsequently, VdF was introduced under pressure to provide a system pressure in the polymerization reactor of 0.75 to 0.80 MPa. The temperature was raised to 70° C.

Then, a polymerization initiator solution prepared by dissolving 1.0 g (1000 ppm/water) of ammonium persulfonate (APS) in 4 ml of ion exchange water and 0.75 g (1500 ppm/water) of ethyl acetate were introduced under pressure of nitrogen gas. Thus, the reaction was initiated while stirring at 300 rpm.

Although this condition was kept for approximately 10 hours 1 minute, no VdF polymer was produced.

The invention claimed is:

1. A method for producing a fluoropolymer, comprising aqueous dispersion polymerization of a monomer or a monomeric mixture including at least one fluoroolefin in the presence of a compound (1) represented by the following formula (1):

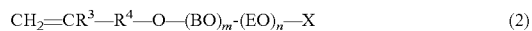

(1)

wherein $R^1$ is an alkyl group; $R^2$ is an alkylene group having two or more carbon atoms; AO is a linear or branched oxyalkylene group having 2 to 4 carbon atoms; p is a positive integer; X is H or $SO_3Y$ wherein Y is $NH_4$ or an alkaline metal; and AO may be the same or different and may form two or more blocks if there is more than one AO.

2. The production method according to claim 1, wherein the compound (1) is a compound (2) represented by the following formula (2):

(2)

wherein $R^3$ is an alkyl group having 1 to 10 carbon atoms; $R^4$ is a linear alkylene group having 2 to 10 carbon atoms; X is defined as in the formula (1); BO is a butylene oxide unit; EO is a $CH_2CH_2O$ unit or a $CH(CH_3)O$ unit; m is an integer of 0 to 50; n is an integer of 0 to 100; and m+n is an integer of 1 to 150.

3. The production method according to claim 1, wherein a fluorosurfactant comprising 6 or less carbon atoms is also present.

4. The production method according to claim 1, wherein the fluoroolefin is at least one fluoroolefin selected from the group consisting of vinyl fluoride, vinylidene fluoride, tetrafluoroethylene, hexafluoropropylene, and chlorotrifluoroethylene.

5. The production method according to claim 1, wherein the monomeric mixture comprises vinylidene fluoride, tetrafluoroethylene, and chlorotrifluoroethylene.

6. The production method according to claim 1, wherein the monomeric mixture comprises vinylidene fluoride and hexafluoropropylene.

7. The production method according to claim 1, wherein the aqueous dispersion polymerization is emulsion polymerization.

* * * * *